Figure 1:
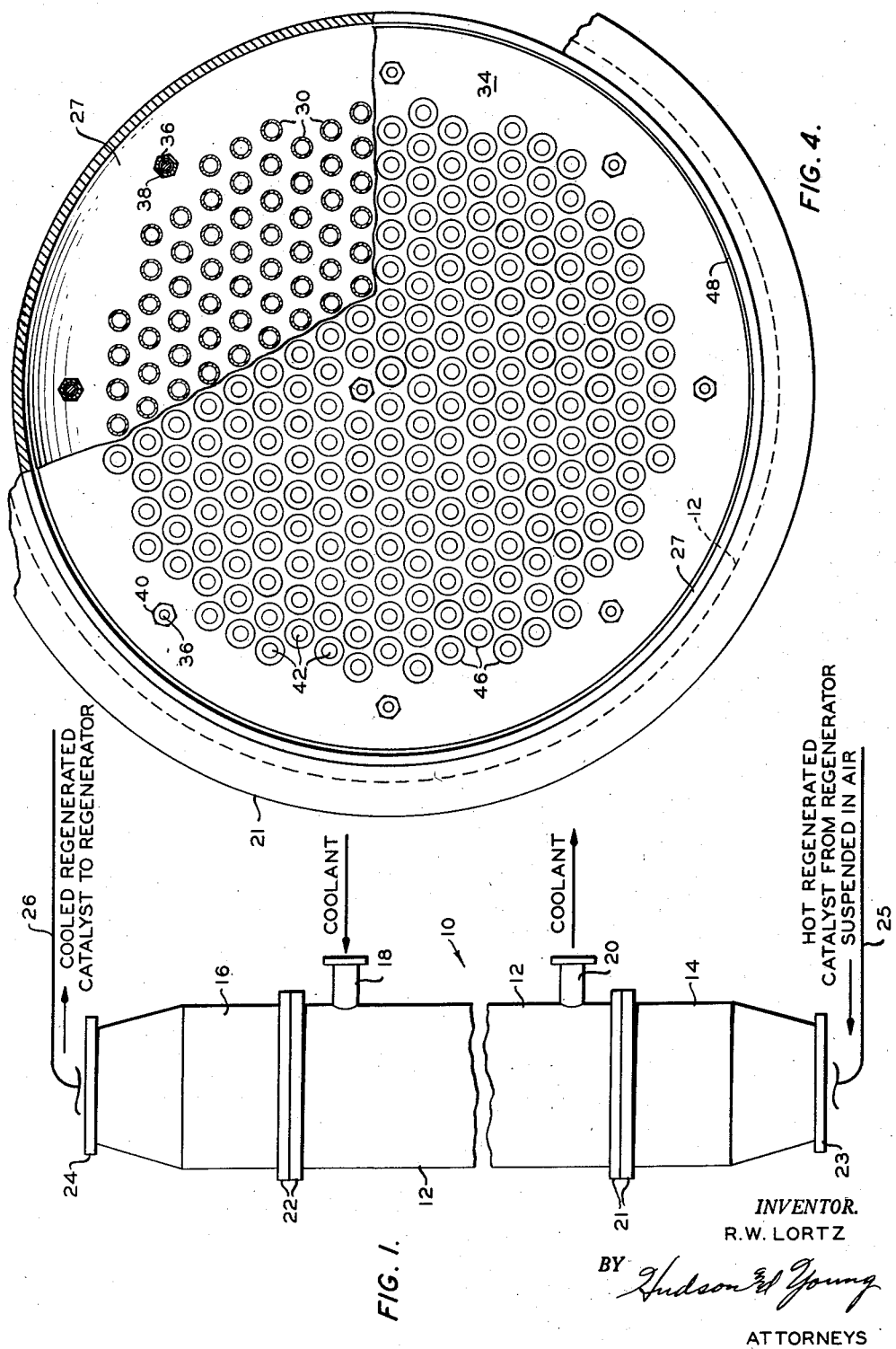

Dec. 2, 1958 — R. W. LORTZ — 2,862,694
HEAT EXCHANGER
Filed Jan. 6, 1956 — 2 Sheets-Sheet 2

INVENTOR.
R. W. LORTZ
BY Hudson & Young
ATTORNEYS

United States Patent Office 2,862,694
Patented Dec. 2, 1958

2,862,694
HEAT EXCHANGER

Russell W. Lortz, Sweeny, Tex., assignor to Phillips Petroleum Company, a corporation of Delaware Application January 6, 1956, Serial No. 557,712

8 Claims. (Cl. 257—224)

This invention relates to an improved indirect heat exchanger for use in effecting indirect heat exchange between fluidized solid particles entrained in a carrier gas and a fluid coolant.

The use of fluidized catalyst techniques in hydrocarbon conversion processes as well as in other chemical processes has come into conventional commercial practice on a substantial scale. A specific application of fluidized catalytic operation is in fluid catalytic cracking units in which the cracking of hydrocarbon material in gaseous form is effected in a dense fluidized bed of finely divided cracking catalyst, such as synthetic silica-alumina or acid treated natural clays. In such a process, the catalyst particles become coated with carbonaceous deposits and must be removed from the cracking reactor and passed to a catalyst regenerator unit in which the carbonaceous deposits are burned from the catalyst using an oxygen-containing gas such as air. In order to maintain the temperature of the regeneration zone below a maximum permissible level, such as about 1200 to 1300° F., it is common practice to remove a portion of the regenerated catalyst particles from the lower section of the catalyst regeneration unit and pass the same in entrainment in a stream of gas (air) through one or more catalyst coolers (arranged in parallel where more than one is used), wherein the catalyst particles are cooled by indirect heat exchange with a suitable coolant, such as water. The catalyst coolers are provided with a large number of cooling tubes surrounded by cooling fluid (water) whereby the catalyst particles entrained in the air passing through the cooling tubes give off heat to the tubes and to the surrounding coolant and are recycled in cool condition to the regenerator in sufficient quantity to compensate for part of the exothermic heat of combustion within the regenerator unit so as to control the temperature therein below a desired maximum.

Erosion is a serious problem in the type of coolers described above, in that the entrance and the first few inches of the tubes suffer relatively rapid erosion from contact with the turbulent catalyst material as it is blown through the tubes. To combat this erosion, it has been customary to install ferrules at the entrance to the tubes, thus permitting removal and replacement of the ferrules with less expense than the replacement of the entire tubes. In this practice, the ferrule has the same outside diameter as the inside diameter of the cooler tubes so that the same may be readily inserted into the tubes five or six inches with five or six additional inches protruding from the end of the tube. The ferrules are spot welded in place and are relatively easily removed for replacement. This design is beneficial but because of the smaller internal diameter of the ferrule as compared with the internal diameter of the tube, the increased velocities through the ferrule cause additional wear thereon and, more important, turbulence is set up at the transition point at the inside end of the ferrule which effects fairly rapid erosion of the cooler tubes at and immediately downstream of this point. I have devised an improved heat exchanger structure which greatly minimizes tube and ferrule erosion and cuts operating costs of the fluidized catalyst coolers.

The principal object of the invention is to provide an improved heat exchanger construction which is relatively simple and minimizes the erosion of cooler tubes in the process of cooling fluidized solid particulate material. Another object of the invention is to provide a heat exchanger cooling tube-ferrule construction which permits easy replacement of the ferrule and avoids increasing velocity of the heat exchange solid through the ferrule. A further object is to provide an improved heat exchanger which minimizes erosion of the heat exchange tubes just downstream of the ferrules. Other objects of the invention will become apparent from consideration of the accompanying disclosure.

Figure 2:
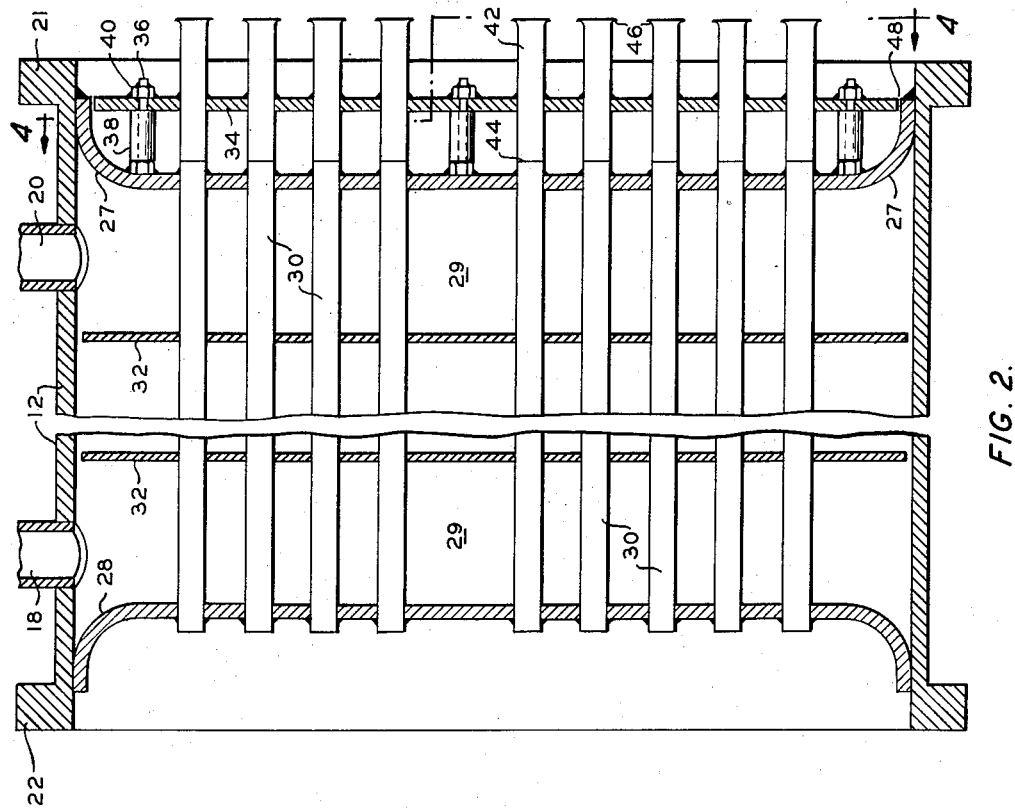
Figure 3:
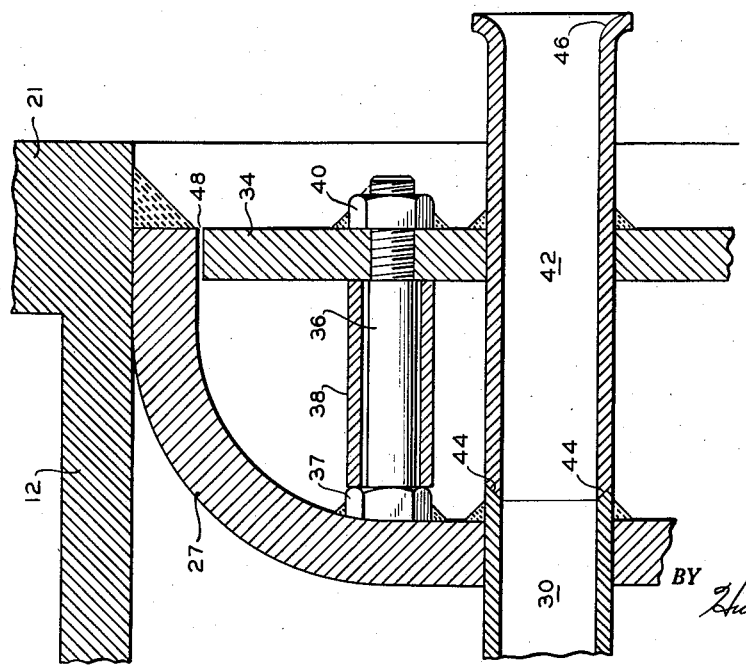

The invention is best described by reference to the accompanying schematic drawing of which Figure 1 is an elevation of a heat exchanger in which the invention is applicable; Figure 2 is a longitudinal partial cross section of the heat exchanger of Figure 1; Figure 3 is an enlarged fragmentary view in partial cross section of a portion of the heat exchanger of Figure 2; and Figure 4 is an end elevation of the heat exchanger shown in Figure 2 with a cut-away section. Corresponding parts or elements of the device in the different views are correspondingly numbered.

Referring to Figure 1, numeral 10 designates a heat exchange or cooler unit comprising a cylindrical shell 12, an inlet housing 14, and an outlet housing 16. Inlet and outlet means 18 and 20, respectively, for coolant are connected with shell 12 adjacent its opposite ends. Flanges 21 and 22 provide means for connecting shell 12 with the inlet and outlet housing, respectively, and flanges 23 and 24 are provided on the ends of the housings to permit attachment to lines 25 and 26, respectively. Line 25 is connected with an air line and with a hot regenerated catalyst line depending from a regenerator, not shown, which effects entrainment of the hot regenerated catalyst in air and feeds the entrained catalyst into line 25. Line 26 connects with the catalyst regenerator to which the cooled catalyst is passed for effecting temperature control in the regenerator. Other catalyst coolers of this type are usually connected in parallel across lines 25 and 26 to provide the volume of cooling required.

Referring to Figure 2, tube sheets 27 and 28 are positioned at opposite ends of shell 12 and form a seal therewith to provide a space 29 for coolant, which is introduced through inlet 18 and withdrawn through outlet 20. Heat exchange or cooling tubes 30 extend through space 29 and through tube sheets 27 and 28 longitudinally of the shell to provide closed paths through space 29 for the gaseous entrainment of solid particles to be cooled. Baffles 32 are positioned in space 29 transversely with respect to shell 12 in conventional manner so as to support the heat exchange tubes between the tube sheets and to provide control of flow of coolant through space 29 in conventional manner.

Positioned at the inlet end of the exchanger is a ferrule support plate 34 which is supported in spaced-apart arrangement with tube sheet 27 by spacing and support means including studs or bolts 36, spacer sleeves 38, and nuts 40, which serve to hold plate 34 against the shoulder of sleeve 38. Support plate 34 is provided with a pattern of holes therethrough which correspond to the holes in tube sheet 27 through which the tubes 30 extend. Ferrules 42 are inserted in the holes in plate 34 so that the inner end of the ferrule abuts the outer end of tube 30 to form a joint 44 which is substantially sealed against flow of solid particles therethrough. The inlet ends of ferrules 42 are flared at 46 and effect a smoother flow pattern than an unflared tube and reduce erosion at the entrance of the tube. Support plate 34 is spaced apart around its circumference a short distance from the edge of tube sheet 27 to provide a small free space 48 so that plate 34 is carried by and bound to only tube sheet 27.

Figure 3 shows in more detail the structural arrangement of tube sheet 27, support plate 34 (with its spacing and attaching means 36, 38, and 40), and ferrules 42. Bolt or stud 36 may comprise a head 37 which is welded to tube sheet 27 and is also provided with a threaded section at the outer end on which nut 40 is threaded to hold plate 34 in engagement with sleeve 38. Nut 40 is spot welded to plate 34 and to stud 36. Tube sheet 27 is welded around its periphery to shell 12 or to the inside of flange 21. Tubes 30 extend through tube sheet 27 a short distance and are welded thereto on the outside of the sheet. Joint 44, between tube 30 and ferrule 42, is chamfered so that the joint extends radially outwardly away from tube sheet 27 and toward plate 34, thereby minimizing the tendency of solid particulate material to migrate through the joint and also providing centering means for the ferrules during assembly. The joint is preferably chamfered at an angle of 45° but the angle of chamfer may be varied, and even a 90° butt joint is operable. The outer end of ferrule 42 is flared as shown at 46 to improve the flow pattern in the mouth of the ferrule.

In assembling the structure shown in Figure 3, studs 36 are inserted in nuts 37, welded to tube sheet 27 so that the studs are normal to the tube sheet surface (in the pattern shown in Figure 4), sleeves 38 are assembled over studs 36, plate 34 is then placed over the studs against sleeve 38, and nuts 40 are then tightened up against plate 34 to hold the same solidly against sleeve 38 and are spot welded to hold the same from turning. Next, ferrules 42 are inserted through the support plate and are held tightly against the ends of tubes 30 while the ferrules are welded to the support plate, the chamfered joint assisting in centering the ferrule. When it is desired to replace any ferrule 42, it is only necessary to remove or break the weld between the plate and the ferrule and withdraw the ferrule, after which another ferrule can be readily inserted in place and welded to support plate 34. Normally, after ferrules 42 are inserted and welded in place prior to flaring the outer end 46 which can be readily done by conventional means.

Figure 4 shows one location pattern for support studs 36, which is effective in efficiently holding the support plate 34 in position, as well as a preferred positional arrangement of tubes 30 and ferrules 42. Other arrangements of the supporting means and heat exchange tubes are, of course, feasible.

An essential feature of the invention is the structural arrangement of support plate 34 and ferrules 42 in relation to tube sheet 27 and tubes 30 which permit the use of a ferrule of the same internal diameter as the internal diameter of the heat exchange tubes, thereby reducing erosion in the permanent heat exchange tubes while permitting easy replacement of the ferrule after they have become eroded from long usage in the cooling of fluidized, particulate, solid, heat exchange material. Tube sheet 27 may be joined by other means to shell 12 and may comprise a circular flat plate the circular edge of which abuts and is sealed to shell 12, although the structure shown, wherein the arcuate edge of the tube sheet is parallel with the shell, is advantageous in combination with the structure shown in providing adequate sealing of the heat exchanger under the usual expansion and contraction conditions occurring in heat exchangers. Tube sheet 28 may be any of conventional type such as a floating-head tube sheet.

A heat exchanger of the design shown in the drawing about 4 feet in diameter and carrying 253 two-inch tubes has been built and tested in service over a substantial period of time and it has been found that erosion in the heat exchange tubes downstream of the joint between the ferrule and the tube has been greatly reduced and substantially eliminated as compared with erosion effected in a similar heat exchanger utilizing ferrules inserted inside the tubes. The flaring of the ferrules at the entrance end has also effected less wear or erosion of the ferrules than occurs without flaring. Thus longer tube life is obtained from the coolers and also longer ferrule life before replacement is required. It has also been found that the ferrules in the constructed heat exchanger are readily replaceable. The heat exchanger described may be also utilized to advantage in heating an entrainment of particulate solids in a gas.

Certain modifications of the invention will become apparent to those skilled in the art and the illustrative details disclosed are not to be construed as imposing unnecessary limitations on the invention.

I claim:

1. A heat exchanger for effecting indirect heat exchange between a fluid and a fluid stream of entrained particulate solids comprising an elongated shell; a pair of spaced-apart tube sheets enclosing a space within said shell; a plurality of tubes for transporting said stream of solids extending longitudinally of said shell thru said tube sheets in sealing relation thereto so as to provide a closed path thru said space, said tubes having inlet ends adjacent one tube sheet and outlet ends adjacent the other tube sheet; a ferrule abutting the inlet end of each of said tubes, said ferrule being of the same internal diameter as its respective tube and the ferrules being supported in axial alignment with their respective tubes by support means attached to the adjacent tube sheet; and inlet and outlet means in said shell communicating with said space for circulating a fluid heat exchange material among said tubes.

2. The heat exchanger of claim 1 wherein said support means comprises a plate removably supported from the adjacent tube sheet in spaced-apart relation thereto by means of spacing rods attached at one end to said tube sheet and adjacent the other end to said plate, said support means and ferrules being detachable as a unit.

3. A heat exchanger for effecting indirect heat exchange between five solids in gaseous suspension and a fluid comprising an elongated cylindrical shell closed adjacent its ends by transverse tube sheets and having inlet and outlet means communicating thru said shell with the space between said tube sheets for introducing and withdrawing heat exchange fluid; a series of heat exchange tubes within said shell extending longitudinally thereof providing closed passageways for said suspension thru said space and said tube sheets, said tubes having inlet ends extending beyond one of said tube sheets a short distance; a ferrule support plate provided with holes correspondingly spaced and positioned to those in said tube sheets supported parallel and in spaced-apart relation to the tube sheet beyond which said tubes extend; means for supporting said support plate; and a ferrule extending thru each said hole in said plate coaxial with and abutting the corresponding tube end to form a closed joint therewith, each said ferrule having the same internal diameter as its corresponding tube to minimize attrition adjacent said joint as said suspension passes from said ferrule into said tube.

4. The heat exchanger of claim 3 wherein said ferrules are flared outwardly on their free inlet ends.

5. The heat exchanger of claim 3 wherein said ferrule support plate and ferrules are detachable as a unit and said plate is spaced from and attached to the adjacent tube sheet by means comprising spaced studs having one end attached to said tube sheets and the other extending thru said plate; a spacing means for each stud extending between said tube sheet and said plate forming a shoulder engaging said plate; and nuts on said studs holding said plate in engagement with said shoulders.

6. The heat exchanger of claim 5 wherein the edge of said plate is spaced inwardly from the surrounding structure to provide a passageway to and from the space between the inner face of said plate and the outer face of the adjacent tube sheet.

7. The heat exchanger of claim 5 wherein the tube sheet adjacent said support plate is inwardly concave so that the outermost section of the sheet is parallel with the wall of the shell; and wherein said plate is disposed diametrically across said outermost section spaced apart therefrom at the periphery of the plate.

8. The heat exchanger of claim 3 wherein the free inlet end of each ferrule is outwardly flared and the joint between each ferrule and its corresponding tube is chamfered so as to extend outwardly toward said plate and inwardly toward said tube sheet thereby facilitating accurate alignment and minimizing leakage thru said joint.

References Cited in the file of this patent

UNITED STATES PATENTS

| | | |
|---|---|---|
| 727,481 | Stuianoff | May 5, 1903 |
| 1,323,013 | Christie | Nov. 25, 1919 |
| 1,531,648 | Dyrssen | Mar. 31, 1925 |
| 1,631,162 | Sebald | June 7, 1927 |
| 1,705,546 | Shipley | Mar. 19, 1929 |
| 1,809,915 | Smith | June 16, 1931 |
| 1,899,926 | Burke | Mar. 7, 1933 |
| 2,213,043 | Jacobsson et al. | Aug. 27, 1940 |
| 2,615,688 | Brumbaugh | Oct. 28, 1952 |